(12) United States Patent
Enderlein et al.

(10) Patent No.: US 7,130,361 B1
(45) Date of Patent: Oct. 31, 2006

(54) TELECOMMUNICATION DEVICE WITH ANALOG FOURIER TRANSFORMATION UNIT

(75) Inventors: Janos Enderlein, Berlin (DE); Jens Wildhagen, Weinstadt (DE); Veselin Brankovic, Esslingen (DE); Besma Kraiem, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 684 days.

(21) Appl. No.: 09/676,152

(22) Filed: Sep. 29, 2000

(30) Foreign Application Priority Data

Sep. 30, 1999 (EP) ................................. 99119440

(51) Int. Cl.
*H04L 27/14* (2006.01)
(52) U.S. Cl. ...................................... 375/324; 375/260
(58) Field of Classification Search ................. 375/260, 375/324, 350, 139, 130; 370/210, 480
See application file for complete search history.

(56) References Cited

U.S. PATENT DOCUMENTS

| | | | |
|---|---|---|---|
| 5,226,038 A | | 7/1993 | Ronnekleiv |
| 6,108,349 A | * | 8/2000 | Melsa et al. .................. 370/465 |
| 6,133,964 A | * | 10/2000 | Han ............................ 348/726 |
| 6,157,191 A | * | 12/2000 | Heid ........................... 324/307 |
| 6,611,551 B1 | * | 8/2003 | Jones et al. .................. 375/219 |
| 6,813,254 B1 | * | 11/2004 | Mujtaba ....................... 370/335 |

FOREIGN PATENT DOCUMENTS

JP 02 933080 8/1999

OTHER PUBLICATIONS

Huemer M et al: "A New Saw Based OFDM Receiver Concept" 1999 IEEE MTT-S International Microwave Symposium Digest (Cat. No. 99CH36282, 1999 IEEE MTT-S International Microwave Symposium Digest, Anaheim, CA, US, Jun. 13-19, 1999, pp. 1847-1850, vol. 4, XP002131923.

Rennekleiv A et al: "Saw Technology for Mobile Satellite Communications Base Station Receivers and Transmitters" Norwegian Signal Processing Symposium, 1995, Hogskolen I Stavanger, NO, Sep. 1, 1995, pp. 81-84, XP000677063.

Sah K L et al: "A Convolve-Multiply-Convolve Saw Processor for a Transmultiplexer" International Journal of Satellite Communications, Nov.-Dec. 1998, Wiley, UK, vol. 16, No. 6, pp. 283-291, XP000884605.

Bakken P M et al: "Frequency Multiplexers and Demultiplexers Based on the Saw Chirp Fourier Transformer Combined with Digital Signal Processing" Proceedings of the Ultrasonics Symposium, IEEE, New York, US, vol. —, 1993, pp. 137-142, XP000473554.

(Continued)

*Primary Examiner*—Kevin Kim
(74) *Attorney, Agent, or Firm*—Oblon, Spivak, McClelland, Maier & Neustadt, P.C.

(57) ABSTRACT

An OFDM telecommunication device, i.e. a receiver, transmitter or transceiver for OFDM—(Orthogonal Frequency-Division Multiplex) signals that generally employs the Inverse Fourier Transformation (IFT) technique to encode and transmit time-division multiplex signals and the Fourier Transformation (FT) technique to decode the received signals into time-division multiplex signals comprises a transformation unit (2) that incorporates at least an analog multiplication step and at least an analog convolution step of a multiplication convolution multiplication algorithm or a convolution multiplication convolution signal to perform a fourier transformation for demodulation and/or an inverse fourier transformation for modulation into the analog stage of said OFDM telecommunication device.

32 Claims, 9 Drawing Sheets

OTHER PUBLICATIONS

Codenie J et al: "Implementation of a Digital Amplitude Detector on the Cordic Transform" Proceedings of the 39th Midwest Symposium on Circuits and Systems (Cat. No. 96CH35995), Proceedings of the 39th Midwest Symposium on Circuits and Systems, Ames, IA, USA, Aug. 18-21, 1996, pp. 860-863, vol .2, XP002131834.

Torsner J et al: "Radio Network Solutions for Heperlan/2" 1999 IEEE 49th Vehicular Technology Conference (Cat. No. 99CH36363), 1999 IEEE 49th Vehicular Technology Conference. Moving into a New Millenium, Houston, TX, US, May 16-20, 1999, pp. 1217-1221, vol. 2, XP002131841.

* cited by examiner

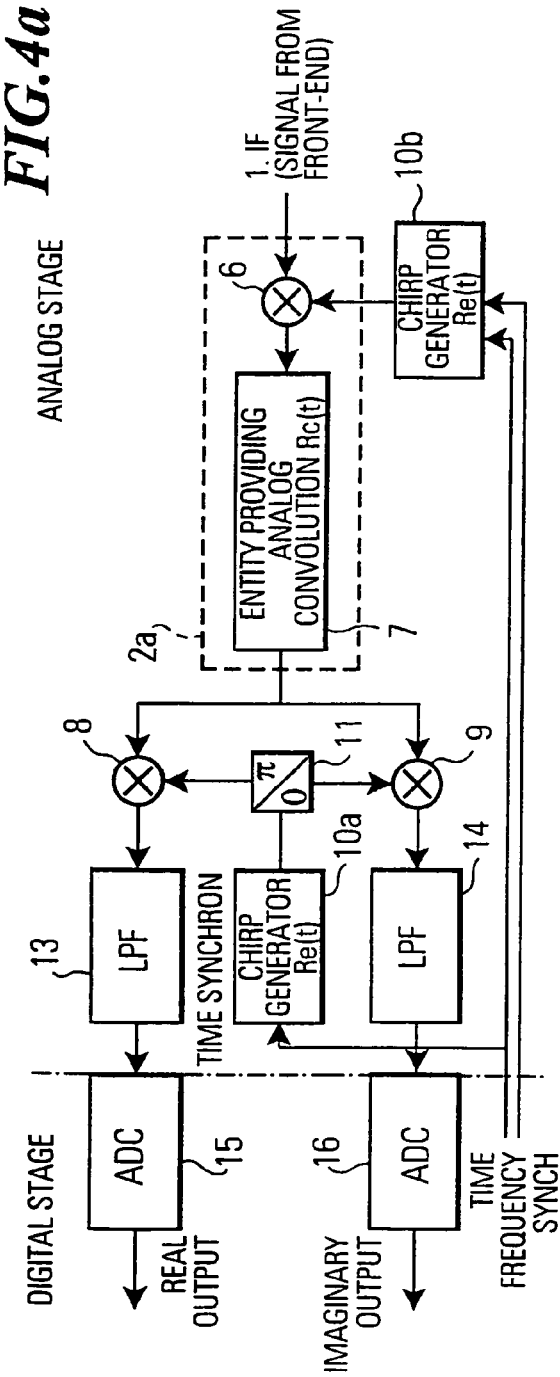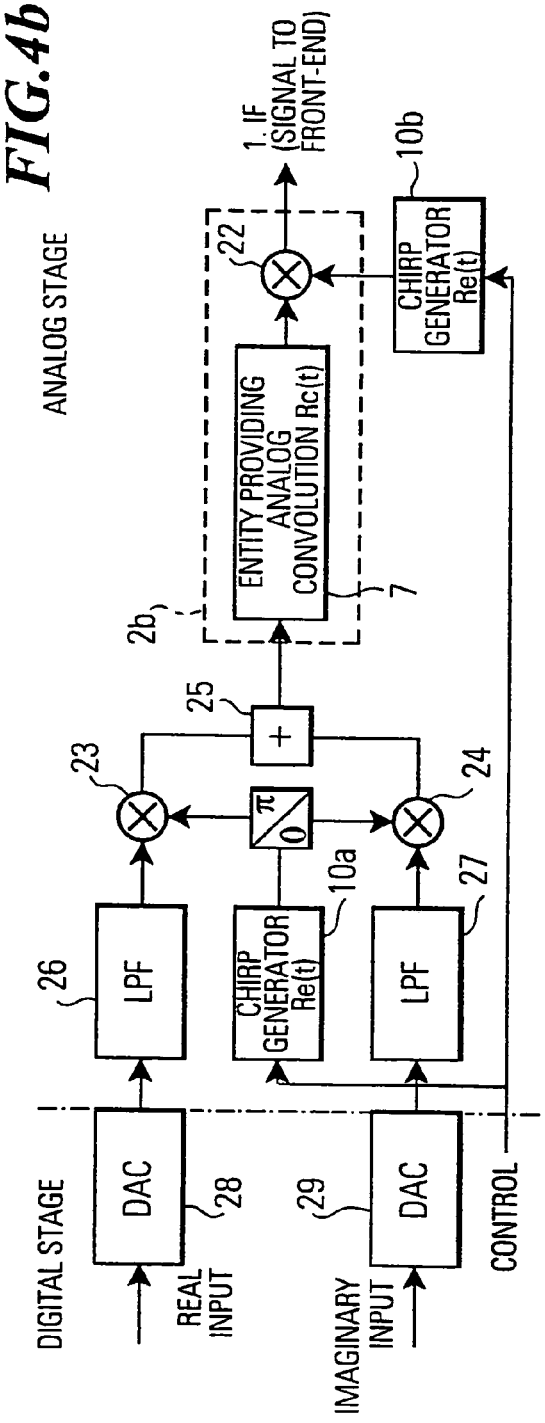

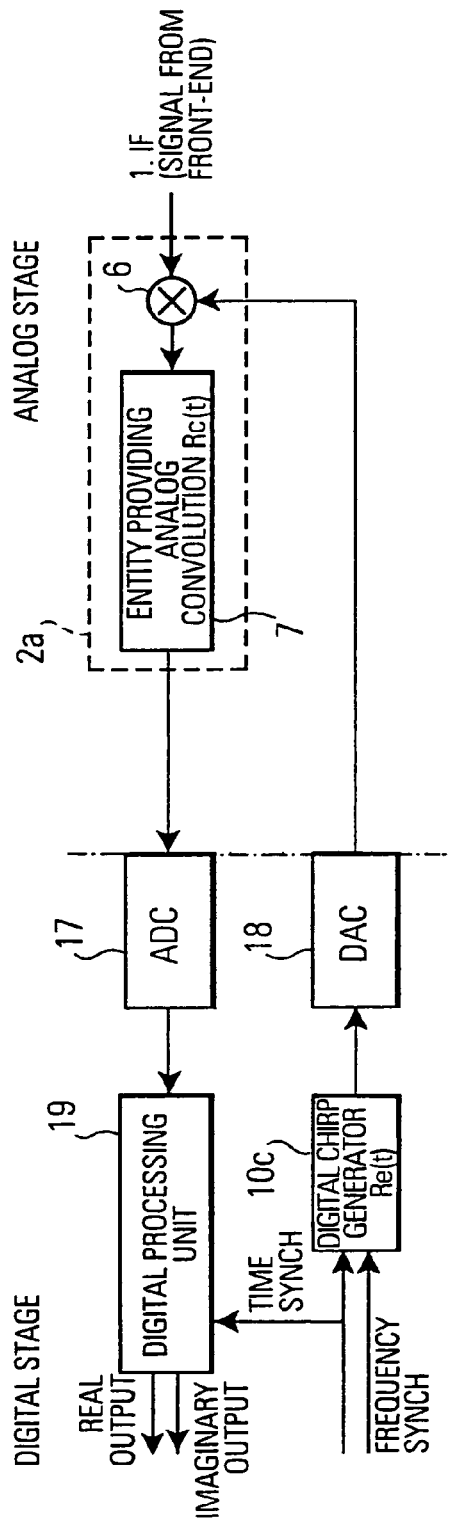
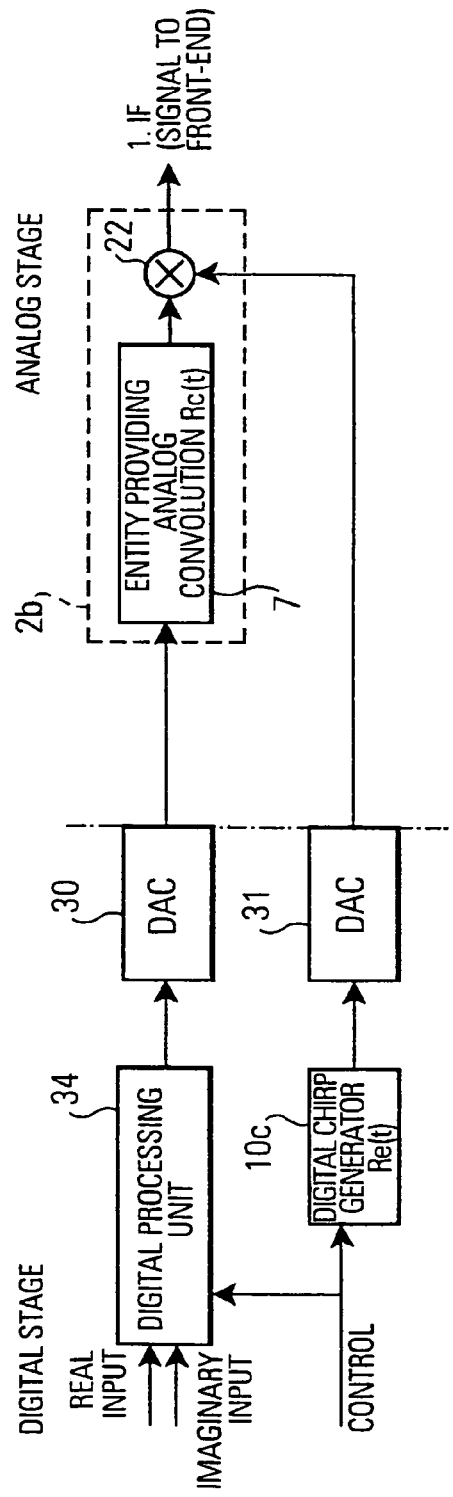

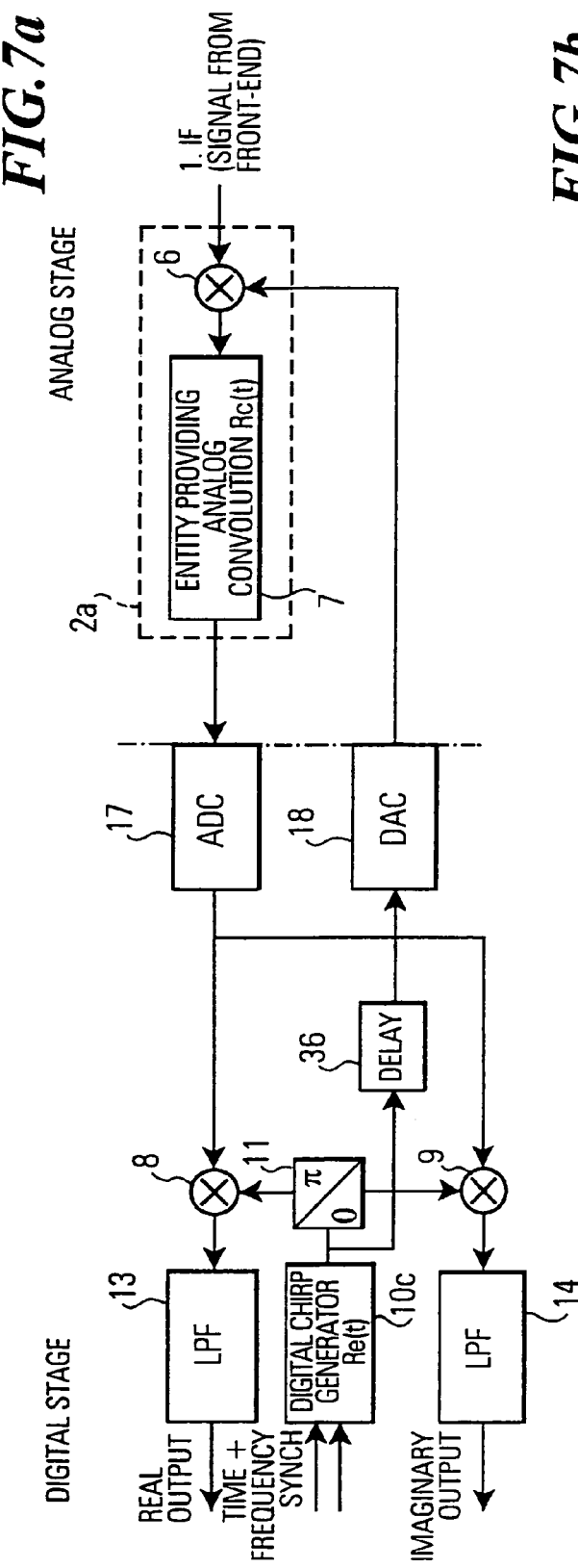
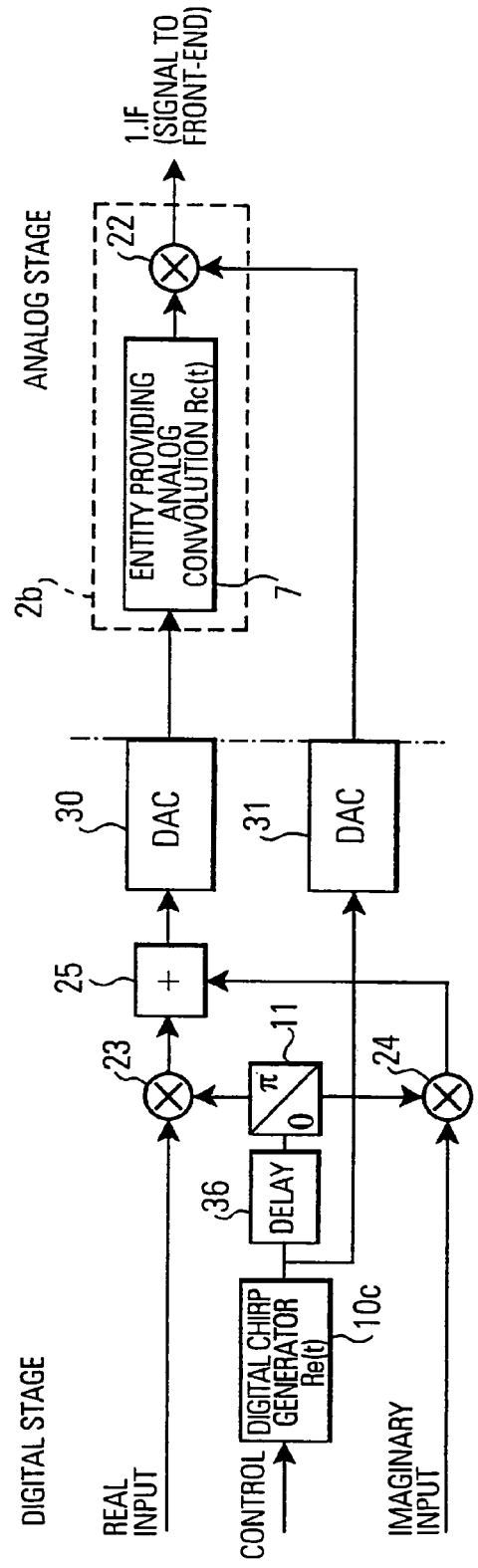

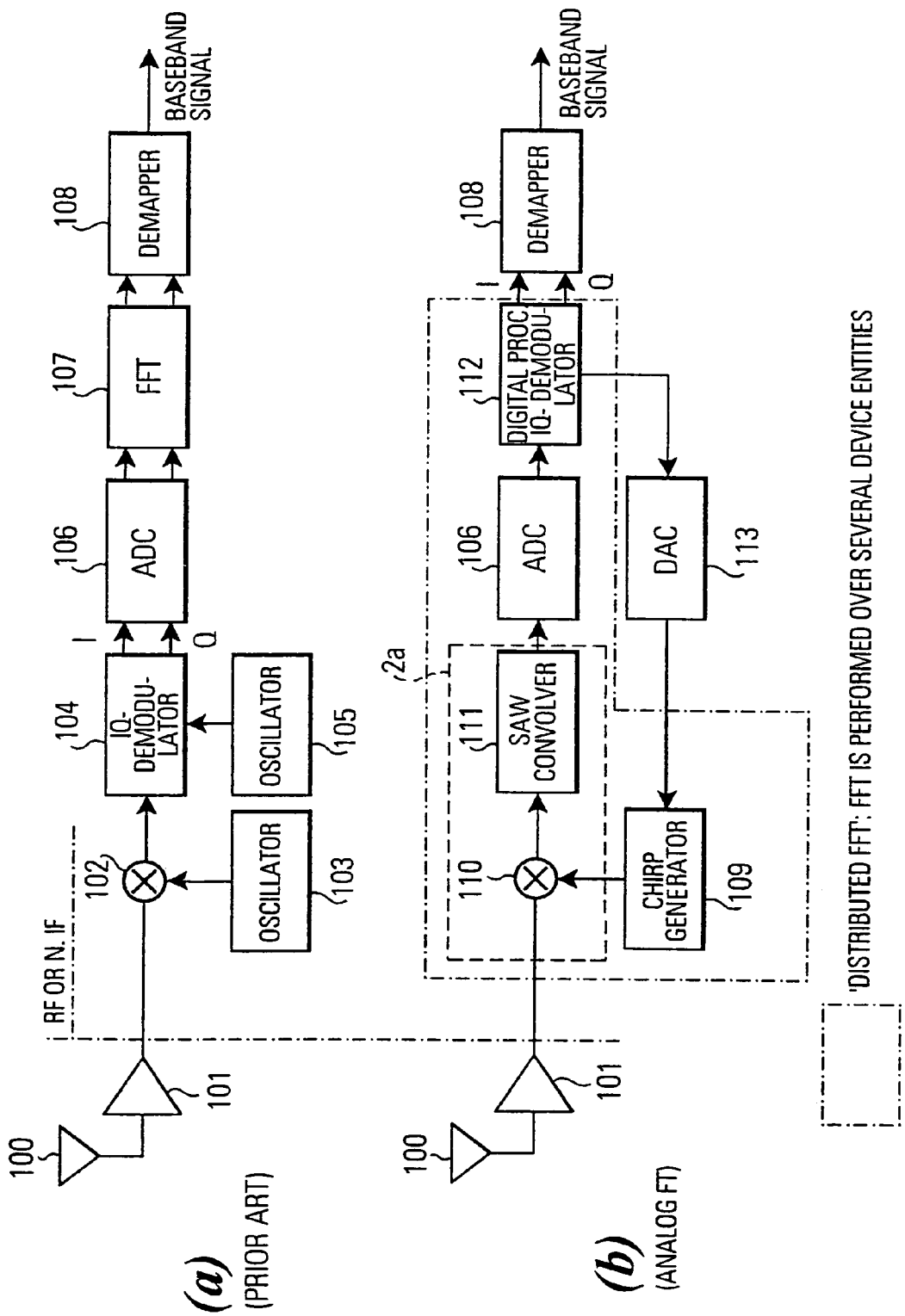

TELECOMMUNICATION DEVICE WITH ANALOG FOURIER TRANSFORMATION UNIT

FIELD OF THE INVENTION

The present invention relates to an OFDM telecommunication device, i.e. to receivers, transmitters and transceivers for OFDM—(Orthogonal Frequency-Division Multiplex) signals that generally employ the Inverse Fourier Transformation (IFT) technique to encode and transmit time-division multiplex signals and the Fourier Transformation (FT) technique to decode the received signals into time-division multiplex signals.

BACKGROUND OF THE INVENTION

A common OFDM receiver is shown in FIG. 8a. The OFDM-signal is received by an antenna 100 and fed via an amplification and pre-processing circuit 101 as RF- or n-IF-signal to a multiplier 102 that down-converts the received, amplified and pre-processed OFDM-signal into an IF-signal on basis of a demodulation signal from an oscillator 103. This IF-signal is input to an IQ-demodulator 104 that additionally receives a demodulating signal from an oscillator 105 and produces the complex spectrum of the demodulated OFDM-signal, i.e. an inphase signal I and a quadrature signal Q. These both signals are input to an analog-to-digital converter 106 to leave the analog stage of the receiver and to enter its digital stage wherein first a Fast Fourier Transformation is carried out with a FFT-unit 107 before a demapper 108 produces a baseband signal for the further processing. It can be seen that an FT-process is implemented within the digital stage which therefore needs a relatively high processing power.

As OFDM modulation schemes seem to be widely accepted for different public broadcasting systems like DAB, DVB-T and private WLANs as a modulation scheme the requirements in regard to the needed bandwidth increase and therefore larger number of carriers are needed, which can be hardly handled by one digital processor. Therefore, to cope with this coming situation, different paralleling techniques have to be incorporated into future OFDM telecommunication devices. Such a block processing (parallel to serial conversion and vice versa) means that a large amount of processing power might be necessary and a large power consumption might arise as well as increased printed circuit board layout requirements have to be thought of.

On the other hand, analog processing techniques to perform the Fourier Transformation are known, e.g. from U.S. Pat. No. 5,226,038 which discloses a method and apparatus for converting electronic signals from frequency-division multiplex format into time-division multiplex format to perform an antenna beam forming and thereafter to perform a conversion from time-division multiplex-format into frequency-division multiplex-format while retaining substantially all phase and amplitude information of a band-limited continuous signal. This document describes the use of the well-known multiplication (M), convolution (C), multiplication (M) and CMC algorithm to perform siuch transformations. Furtheron, it is described that a Fourier Transformation of an analog signal sequence can be performed either by the MCM algorithm under use of chirp signals or the CMC algorithm with such signals. In this context also a reference is given to Fourier transform processors based on Surface Acoustic Wave filters.

Furtheron, a description given by the Phonon Corporation discloses to assemble spectrum analyzers and Fourier transformers from sets of dispersive delay lines to perform a scanning for determining on which frequencies signals are present. This description discloses that applications of such systems are also advanced communiation techniques, since they can process in real time at rates far in excess of current digital techniques, with relatively little size, weight and power.

The mathematical foundations for the MCM operation is shown in the following. Under consideration of the Fourier Transformation S(f) of a signal s(t) which is bandlimited to Be and of a maximum duration Te, the Fourier Transformation integral can be written in the form of the "chirp transform algorithm":

Operation:

$$S(f) = S(-a \cdot t) = ((s(t) \cdot Re(t)) * Re(t)) \cdot (t),$$
$$\quad\quad\quad\quad\quad\quad\quad M \quad\quad C \quad\quad M$$

where · is multiplication, * is convolution, a=Be/Te is a scale factor, Re(t) is a chirp signal with the chirp rate–a=–Be/Te and Rc(t) is the impulse response of an entity providing analog convolution with a length Tc=2Te and a chirp rate a=Bc/Tc.

However, no realization of a telecommunication device, e.g. an OFDM receiver as shown in FIG. 8a, using such analog Fourier transformers for modulation and/or demodulation purposes is known.

SUMMARY OF THE INVENTION

Therefore, it is the object underlying the present invention to provide an improved OFDM telecommunication device that can cope with high bandwidth, but has an uncomplicated realization.

This object of the present invention is solved by an OFDM telecommunication device according to independent claim 1. Preferred embodiments thereof are respectively defined in the dependent subclaims.

An OFDM telecommunication device which comprises an analog RF and IF stage and a digital stage to output the baseband signal according to the present invention is characterized by a transformation unit that incorporates at least an analog multiplication step and at least an analog convolution step of a multiplication convolution multiplication algorithm or a convolution multiplication convolution algorithm to perform a Fourier Transformation for demodulation and/or an Inverse Fourier Transformation for modulation into the analog stage.

Therefore, according to the present invention not the whole MCM or CMC algorithm as shown in the prior art is incorporated into the FFT or IFFT block of a state of the art receiver or transmitter, but the Fourier Transformation or Inverse Fourier Transformation is performed distributed over several device entities. This arrangement has the advantage that several operations necessary within the state of the art telecommunication device can be adapted to perform there usual functionality as well as parts of the MCM or CMC algorithm. In particular, both multiplication steps of the MCM algorithm can be combined with the RF/IF up- or down-conversion and the modulation or demodulation, i.e. the IQ modulation or demodulation. Therefore, the transformation unit according to the present invention is preferably arranged in the lowest IF-stage.

Another advantage is that in case of the MCM algorithm only those processing steps that require high bandwidth, i.e. the up- or down-conversion multiplication step and the convolution step, are necessarily performed with analog devices and the IQ modulation or demodulation step can be performed in the digital stage if this is desired.

Furtheron, in case of a transceiver which incorporates the MCM algorithm, the same analog convolution and multiplication device can be used for receiving and transmitting, but only the sign of the slope of the chirp functions has to be changed for the different functionality, since all ODFM-systems are time multiplex semi duplex systems.

Still furtheron, according to the present invention, a correlator used to perform the FFT can also be used to perform the ODFM time synchronization.

BRIEF DESCRIPTION OF THE DRAWINGS

The present invention and its objects, features and advantages will be better understood from the following description of exemplary embodiments thereof taken in conjunction with the accompanying drawings, wherein

FIGS. 4a and 4b show block diagrams of an OFDM receiver and an OFDM transmitter according to a first further preferred embodiment of the present invention;

FIGS. 5a and 5b show block diagrams of an OFDM receiver and an OFDM transmitter according to a second further preferred embodiment of the present invention;

FIGS. 7a and 7b show block diagrams of an OFDM receiver and an OFDM transmitter according to a fourth further preferred embodiment of the present invention;

FIGS. 8a and 8b show a receiver according to the prior art in comparison to a receiver according to an embodiment of the present invention.

DETAILED DESCRIPTION OF THE INVENTION

The advantageous exemplary embodiments show only an incorporation of the MCM algorithm, since its implementation offers more flexibility. On the other hand, the present invention is not limited thereto and those skilled in the art are aware of the modifications necessary to implement the CMC algorithm.

Figure 1:
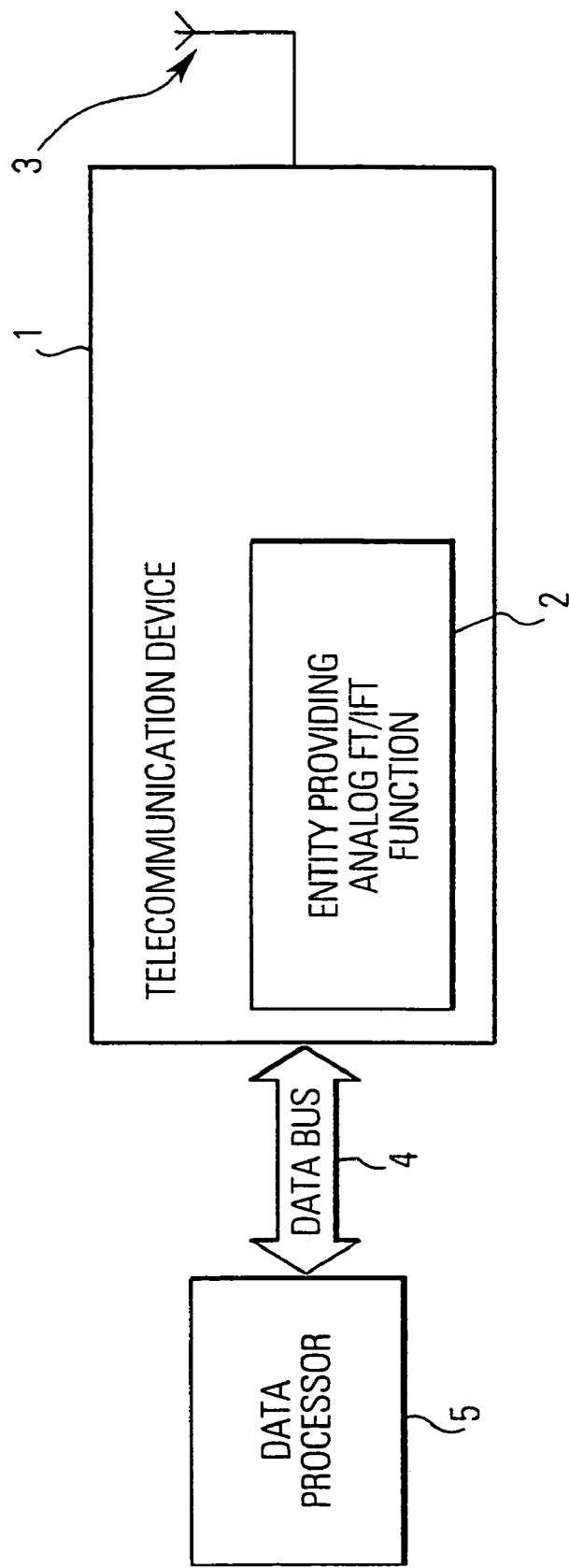
FIG. 1 shows an OFDM telecommunication device according to the present invention.

FIG. 1 shows an OFDM telecommunication device 1 that is connected via a data bus 4 to a data processor 5. The telecommunication device 1 comprises an antenna 3 and a transformation unit 2 according to the present invention which provides an at least partly analog FT/IFT processing function.

The telecommunication device 1 can be either a receiver receiving OFDM-signals via the antenna 3 and outputting data signals calculated with the help of the at least partly analog Fourier Transformation by a receiver transformation unit 2a to the data processor 5 via the data bus 4, a transmitter receiving data signals from the data processor 5 via the data bus 4 and generating OFDM-signals to be output via the antenna 3 on basis of the at least partly analog calculated Inverse Fourier Transformation by a transmitter transformation unit 2b, or a transceiver combining these both functions.

An analog FT/IFT function in this context means that in case of a transmitter at least the convolution and the following multiplication of the MCM algorithm are calculated with analog means, i.e. the transmitter transformation unit 2b comprises an input stage with an analog delay means having different delay properties, such as a specially designed surface acoustic wave device or a charge coupled device, followed by an analog multiplier as output stage which additionally receives a corresponding chirp signal to multiply the output signal of the analog delay means with. The preceding multiplication can e.g. also be performed within the transmitter transformation unit 2b or within an IQ processing stage that is arranged preceding to the transmitter transformation unit 2b. In case of a receiver, on the other hand, at least the convolution and the preceding multiplication is conducted by analog means, i.e. the receiver transformation unit 2a comprises an input stage with an analog multiplier to multiply the input signal with a chirp signal, followed by an analog delay means having corresponding different delay properties, such as a surface acoustic wave filter or a charge-coupled device. The following multiplication can e.g. also be performed within the receiver transformation unit 2a or within an 11 processing stage following the receiver transformation unit 2a.

The respective other multiplication necessary for conducting the MCM algorithm, i.e. the preceding multiplication in case of a transmitter and the following multiplication in case of a receiver, can either be conducted analogically or digitally.

Figure 2:
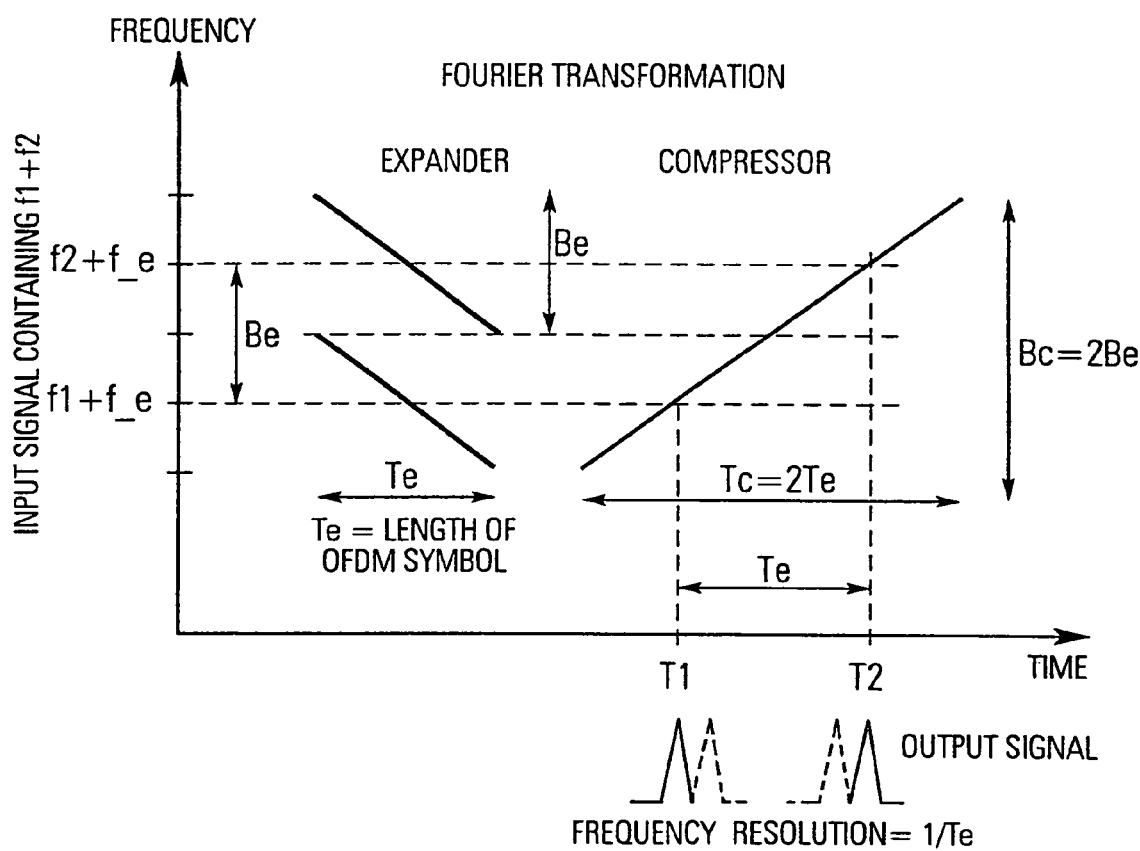
FIG. 2 shows the schematic signal flow for the analog Fourier Transformation used within the telecommunication device shown in FIG. 1.

FIG. 2 shows the schematic signal flow for the analog Fourier Transformation using the MCM algorithm, i.e. the schematic signal flow from the multiplication with following convolution conducted within an OFDM receiver according to the present invention.

The left-hand side of the time frequency graph shows the expanded signal as it appears at the compressor input which contains a lowest frequency f1 and a highest frequency f2 with a chirp signal Re(t) with a chirp rate –a=–Be/Te wherein Be is the bandwidth, i.e. f2–f1, and Te is the length of one OFDM symbol. Exemplary shown are the two cases of a multiplication of f1 with the chirp signal and f2 with the chirp signal. The resulted chirp signal has the resulted center frequency f_e. Therefore, the left hand side of the time frequency graph shows the shifting of f_e by an upper input frequency f2 and a lower input frequency f1.

Preferably, within this step the down-conversion of the radio frequency to the lowest intermediate frequency stage is performed. In this case the demodulator 102 as described and shown in connection with FIG. 8a can be omitted. Instead, an OFDM receiver according to the present invention which can be compared to the OFDM receiver according to the prior art shown in FIG. 8a comprises a multiplier 110 that receives a first chirp signal which is provided by a first chirp generator 109, as shown in FIG. 8b. This multiplier 110 performs the first multiplication of the MCM algorithm and preferably simultaneously the down-conversion of the RF signal to the IF signal. To simultaneously perform the down conversion, the center frequency of the chirp signal must correspond to the respective incoming frequency range, i.e. RF or IF.

The chirp signal can be the impulse response of a device having different propagation delay properties like a surface acoustic wave chirp filter or a signal which is generated by a chirp generator 109, as it is shown in FIG. 8b. The chirp generator 109 can generate the chirp signal in an analog or digital manner.

The right-hand side of the time frequency graph shown in FIG. 2 shows the compression, i.e. the convolution of the multiplied RF-signal with the impulse response Rc(t) of an analog delay means having different delay properties. Such a delay means has different propagation delays for different frequencies and can be e.g. a SAW (Surface Acoustic Wave) chirp filter or a special CCD (Charge-Coupled Device). The impulse response is of a length Tc=2Te and a chirp rate a=Bc/Tc.

Preferably, the operation is done in the IF stage with center frequencies between 100 MHz and 1 GHz and bandwidths of 20–100 MHz.

For the examle shown at the left hand side of the time frequency graph, the right hand side of said graph shows one sloped line indicating the points of time of appearance of the respective signal in the time domain. In the shown case the frequency f1+f_e determines a point of time T1 and the frequency f2+f_e determines a point of time T2. At each of said points of time T1 and T2 a correlation peak is output as it is indicated on the lower right hand side of FIG. 2. Dashed peaks inbetween said both correlation peaks at T1 and T2 are caused by possible input frequencies between f1 and f2. The shown frequency resolution=1/Te is determined by the correlator.

In the embodiment of the present invention shown in FIG. 8b, this convolution step of the MCM algorithm is performed with a SAW convolver 111 that receives the output signal of the multiplier 110. In this embodiment the multiplier 110 and the SAW convolver 111 build the receiver transformation unit 2a. The further signal processing can be performed in the digital way. Therefore, the output signal of the SAW filter 111 is input to an analog-to-digital converter 106 before a digital processor and IQ demodulator 112 further processes the signals and outputs them as digital inphase and quadrature signals I and Q to a demapper 108 which outputs the baseband signal.

Of course, at least some steps of the further signal processing can also be performed in the analog way, e.g. the last multiplication of the MCM algorithm and the IQ generation which can also be combined, as will be explained lateron. The analog way inherits the advantage to handle a higher bandwidth (estimated>60 MHz) in comparison to the digital way according which allows a higher flexibility at moderate bandwidth (estimated<60 MHz).

In the embodiment of the present invention shown in FIG. 8b the digital processor and IQ demodulator 112 supplies a control signal to the first chirp generator 109 via a digital-to-analog converter 113 which indicates to the first chirp generator 109 at which time a generated first chirp signal should begin and how this first chirp signal should look like.

FIG. 8b shows that according to the present invention the output signal of the surface acoustic wave convolver 111 is input to a digital processor and IQ demodulator 112 via an analog-to-digital converter 106. The analog-to-digital converter 106 also performs the IF to baseband conversion on basis of an undersampling. The digital procesor and IQ demodulator 112 multiplies the resulting signal with a second chirp signal Re(t) at a chirp rate−a=−Be/Te. The second chirp signal is generated within the digital processor and IQ demodulator 112 itself. Furtheron, the separation of the amplitude and phase information is performed using a 90° phase splitter for Re(t) similar to common IQ modulators.

Of course, depending on the wanted implementation the last multiplication of the MCM algorithm and the IQ demodulation can also be performed within the analog stage whereafter the resulting inphase and quadrature signals will be supplied to the demapper 108 via an analog-to digital converter.

However, as mentioned above, according to the present invention a combination of the IQ demodulation and the last multiplication of the MCM algorithm is advantageously performed. This can be done by a multiplication of the out-put signal of the delay means with the inphase component of the second chirp signal Re(t) to obtain the inphase component of the complex spectrum of the demodulated OFDM signal as well as a multiplication of the output signal of the delay means with the quadrature component of the second chirp signal Re(t) to obtain the quadrature component of the complex spectrum of the demodulated OFDM signal. Such multiplications can be performed within the analog stage or within the digital stage with a chirp signal that is analogically generated or that is digitally generated. Of course, the IQ demodulation can be performed with all generally known algorithms or methods.

Using the Fourier Transformation algorithm described above a fast execution of the Fourier Transformation of subsequent following OFDM symbols can be realized.

Figure 3:
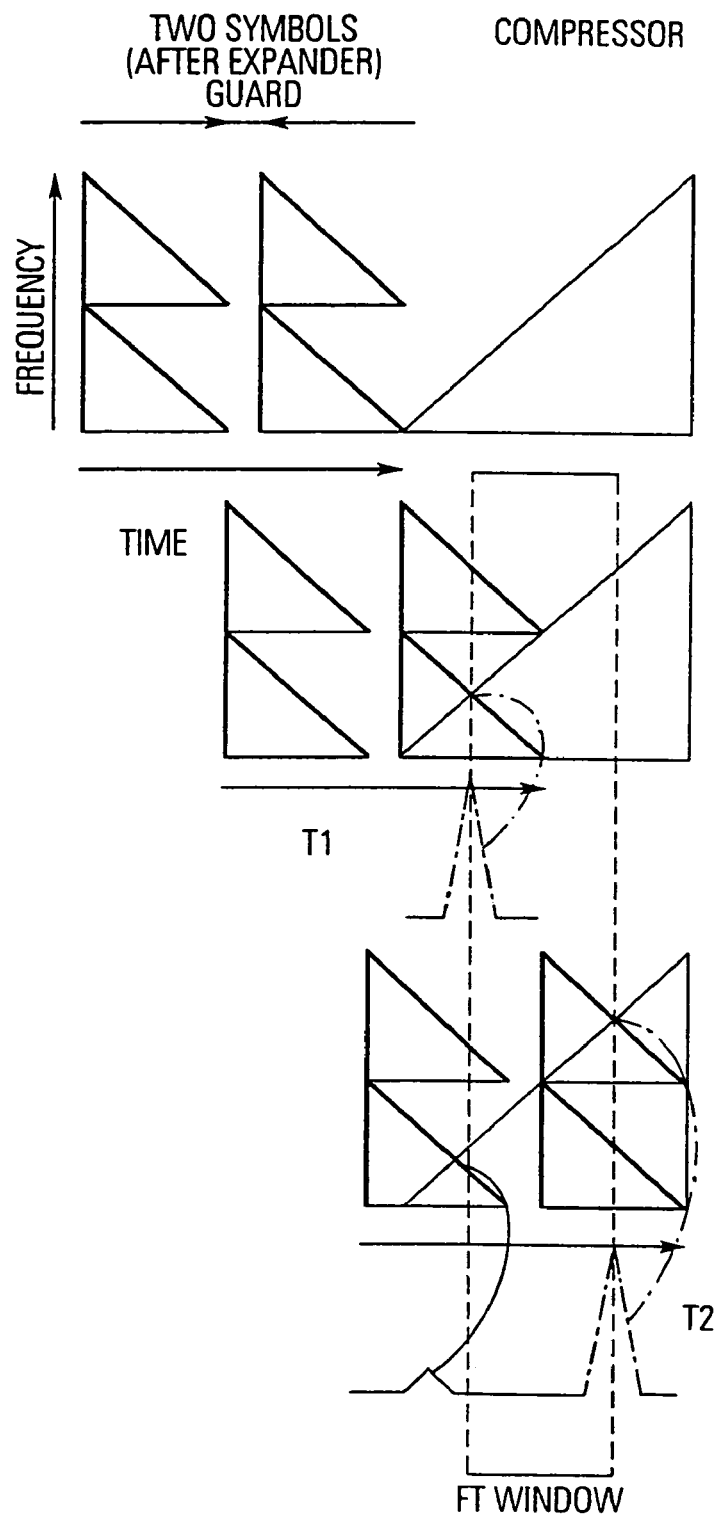
FIG. 3 shows the schematic signal flow for the Fourier Transformation of subsequent OFDM symbols within the telecommunication device shown in FIG. 1.

The processing of subsequent following OFDM symbols according to the present invention is shown in FIG. 3. Two subsequent symbols are separated by a guard interval. The Fourier Transformation of the first symbol is performed in the shown FT window without disturbance by the following symbol.

The upper part of FIG. 3 shows that first the output signals from the expander are fed into the compressor. This part of the diagram is similar to FIG. 2. The output signals of the expander are shown as lowerst chirp and hightest chirp. Of course, a number of different chirps can be in-between those both shown chirps.

The middle part of FIG. 3 shows that the lowest chirp, i.e. the chirp of the lowest frequency, from the expander which is completely fed into the compressor causes the first output signal peak at the time T1. The highest chirp, i.e. the chirp of the highest frequency, or a chirp lying in-between the lowest and highest chirps does not produce an output signal at T1.

The lower part of FIG. 3 shows that the highest chirp signal which is completely fed into the compressor generates an output signal at the time T2. The time in-between T1 and T2 corresponds to the FT window. All chirps lying in-between the lowest and highest chirps produce output signals in-between T1 and T2. The lowest frequency chirp or a chirp lying in-between the lowest and highest chirps does not generate a signal at T2. Also, the following lowest chirp signal does not generate a signal at T1.

In the following four further preferred embodiments of the present invention additionally to the embodiment shown in FIG. 8b are described. In the following description of these further preferred embodiments the same, similar or corresponding elements are denoted with the same reference signs.

FIG. 4a shows a block diagram of an OFDM receiver according to a first further preferred embodiment of the present invention. The incoming IF-signal from the (not shown) front-end module of the OFDM receiver is input to a multiplier 6 that multiplies this IF-signal with a first chirp signal Re(t) generated by a first chirp generator 10b. If it is desired, this multiplier 6 can simultaneously perform the RF down-conversion to IF in case the front-end module outputs a RF-signal as described above.

The first chirp signal Re(t) can be generated either by an analog or digital signal generator or using the impulse response of a chirp filter, e.g. a surface acoustic wave chirp filter or a charge-coupled device. The first chirp generator 10b receives time- and frequency-synchronisation signals according to which the first chirp signal Re(t) is generated. Therefore, the chirp signal Re(t) is controlled in start time and center frequency.

The output signal of the multiplier 6 is input to a convolver 7 which provides an analog convolution, e.g. a surface acoustic wave chirp filter or a charge-coupled device. The convolver 7 and the multiplier 6 together build the receiver transformation unit 2a which is incorporated into the analog stage of the OFDM receiver and which provides the first multiplication and the convolution of the MCM algorithm.

The output signal of the receiver transformation unit 2a is input to a second multiplier 8 which multiplies it with a second chirp signal Re(t) and to a third multiplier 9 which multiplies it with said second chirp signal Re(t) which is phase-shifted bei 90°. Therewith, each of said both multipliers 8 and 9 performs the last multiplication of the MCM algorithm to complete the Fourier Transformation. Simultaneously an IQ demodulation is performed, since amplitude and phase information of the complex spectrum of the demodulated OFDM signal are separated by using a 90° phase splitter for the second chirp signal Re(t). Furtheron, also a down-conversion from the intermediate frequency to the baseband can be performed simultaneously, since the multiplication provides a lower and an upper sideband and the lower sideband is the baseband signal.

The center frequencies of the first chirp signal generated by the first chirp generator 10b for the signal expansion by the multiplier 6 and the second chirp signal generated by a second chirp generator 10a which is also used for the IQ demodulation can be different. Since all other parameters of these both chirp signals are equal, both of those signals are called Re(t). In contrast to the first chirp generator 10b which receives time- and frequency-synchronisation signals, the second chirp generator 10a only receives a time synchronisation signal, since only the start of the chirp signal has to be controlled in this stage.

The center frequency of the second chirp can be fixed. The frequency synchronization is only additionally necessary for controlling the center frequency of the first chirp signal.

The output signal of the second multiplier 8 is input to an analog-to-digital converter 15 via a low-pass filter 13 to be fed to the digital stage as real signal and the output signal of the third multiplier 9 is input to an analog-to-digital converter 16 via a low-pass filter 14 to be fed to the digital stage as imaginary signal. In case the down-conversion from IF to baseband is not performed simultaneously with the multiplication with the second chirp signal, such a down-conversion can advantageously be performed during the analog to digital conversion.

FIG. 4b shows a block diagram of a corresponding OFDM transmitter according to the first preferred embodiment of the present invention, i.e. an OFDM transmitter performing the MCM algorithm completely within the analog stage. Furtheron, the OFDM transmitter incorporates the IQ modulation as well as the baseband to IF up-conversion within the first multiplication step of the MCM algorithm and IF to IR up-conversion within the last multiplication step of the MCM algorithm.

The (not shown) digital stage of the shown OFDM transmitter provides real and imaginary input signals. The real input signal is supplied to a fifth multiplier 23 via a digital-to-analog converter 28 and a low-pass filter 26. The multiplier 23 multiplies the incoming signal with a second chirp signal Re(t) generated by a second chirp generator 10a which generates said chirp signal based on a control signal. This control signal is directly comparable to the time synchronization signal used within the receiver and therefore cares for a synchronous processing (multiplication) of the OFDM signals with the chirp signals. The imaginary input signal is supplied to a sixth multiplier 24 via a digital-to-analog converter 29 and a low-pass filter 27. The sixth multiplier 24 multiplies the input signal with said second chirp signal Re(t) which is phase-shifted by 90°. The output signals of said both multipliers 23 and 24 are input to an adder 25 which adds them and inputs the resulting sum signal to a transmitter transformation unit 2b which performs the convolution and second multiplication of the MCM algorithm in an analog manner.

The transformation unit 2b comprises an analog delay means 7 as input stage and an analog multiplier 22 as output stage. The output signal of said analog delay means 7 is input to the analog multiplier 22 which multiplies with a first chirp signal Re(t) generated by a first chirp generator 10b which also receives the control signal supplied to the chirp generator 10a.

As mentioned above, the second and first chirp signals Re(t) generated by the second chirp generator 10a and by the first chirp generator 10b are identical apart from their center frequencies which might be different. Both signals are also identical to the chirp signals used in the receiver and have the same time relationships.

The analog multiplier 22 might not only perform the last multiplication of the MCM algorithm, but can simultaneously perform an up-conversion from the IF-signal to the RF-signal to be transmitted via a (not shown) front-end module similarlay to the down-conversion advantageously performed within the receiver transformation unit 2a.

To perform the IFT within the transmitter the same MCM algorithm is used as within the receiver, but chirp signals with a different slope are used, i.e. with a slope having the inverse sign, whereas the passive correlator can be the same element, since the signal flow is inversed, i.e. the terminal serving as input in case of a receiver servers as output in case of a transmitter and the terminal serving as output case of a receiver serves as input in case of a transmitter.

A block diagram of an OFDM receiver according to a second further preferred embodiment of the present invention is shown in FIG. 5a. In contrast to the OFDM receiver according to the first further preferred embodiment in which the whole MCM algorithm is performed in the analog stage of the receiver, according to the second further preferred embodiment only parts of the MCM algorithm are performed in the analog stage, namely the first multiplication and the convolution. Therefore, the receiver transformation unit 2a is identical to and has the same functionality as the receiver transformation unit 2a of the first further preferred embodiment. The output signal of the analog convolver 7 is input to a digital processing unit 19 via an analog-to-digital converter 17. The digital processing unit 19 additionally receives a time synchronisation signal and based on its both input signals generates real and imaginary output signals. The digital processing unit 19 performs the second multiplication of the MCM algorithm, i.e. a multiplication of the output signal of the analog convolver 7 with a second chirp signal generated within the digital processing unit 19 and the IQ generation. The IF-to-baseband-conversion is performed in the digital processing unit 19.

According to this second further preferred embodiment the first chirp signal Re(t) supplied to the first analog multiplier 6 is generated by a first digital chirp generator 10c which receives the time synchronisation signal and a frequency synchronisation signal. The first digital chirp generator 10c supplies the first chirp signal to the first multiplier 6 via a digital-to-analog converter 18.

A corresponding OFDM transmitter according to the second preferred embodiment of the present invention is shown in FIG. 5b.

Real and imaginary input signals are supplied to a digital processing unit 34 which performs the first multiplication of the MCM algorithm with a second chirp signal Re(t) generated within the digital unit 34 based on a control signal input thereto. Furtheron, the digital processing unit 34 performs an up-conversion to the first IF. The IF output signal of the digital processing unit 34 is supplied to a transformation unit 2b via a digital-to-analog converter 30. Said transmitter transformation unit 2b is identical to the transmitter transformation unit 2b of the first further preferred embodiment according to the present invention.

Similar to the receiver according to the second further preferred embodiment of the present invention shown in FIG. 5a also the OFDM transmitter according to the second further preferred embodiment of the present invention shown in FIG. 5b comprises a first digital chirp generator 10c that supplies the digitally generated first chirp signal Re(t) to the fourth multiplier 22 of the transformation unit 2b via a digital-to-analog converter 31. The first digital chirp generator 10c generates the first chirp signal Re(t) based on a control signal.

Figure 6A:
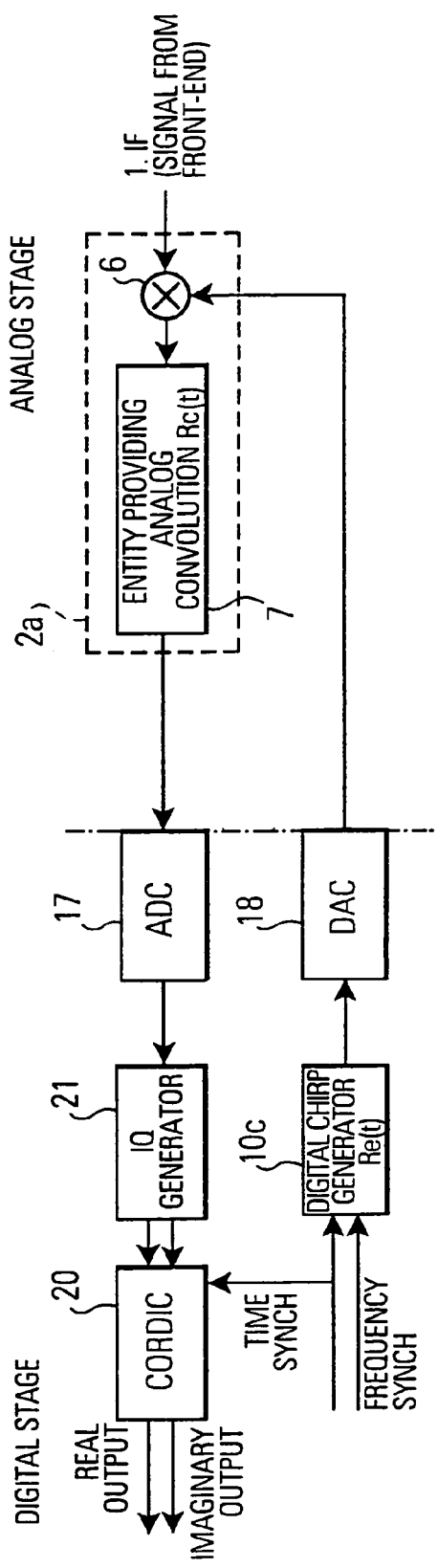
FIGS. 6a and 6b show block diagrams of an OFDM receiver and an OFDM transmitter according to a third further preferred embodiment of the invention.

FIG. 6a shows a block diagram of an OFDM receiver according to a third further preferred embodiment of the present invention. This embodiment basically works similar to the OFDM receiver according to the second further preferred embodiment of the present invention shown in FIG. 5a, but the digital processing unit 19 within the digital stage that performs the second multiplication of the MCM algorithm and the IQ demodulation is exchanged with an IQ generator 21 directly after the analog-to-digital converter 17 that digitally generates the inphase and quadrature signals which are then input into a CORDIC block 20 that performs the second multiplication of the MCM algorithm on basis of the CORDIC algorithm and therefore outputs the real and imaginary signals of the complex spectrum of the demodulated OFDM signal. Therefore, said CORDIC block 20 also receives the time synchronisation signal similar to the digital processing unit 19 of the first further preferred embodiment.

The CORDIC algorithm is a very simple way to replace the complex multiplication in the IF stage with a phase rotation in the baseband which has the same effects. Therefore, the CORDIC algorithm replaces the respective multipliers and low pass filters shown in the first further preferred embodiment, since aliasing signals present in the baseband which have to be filtered out in the IF stage are simply discarded by the CORDIC algorithm.

Figure 6B:
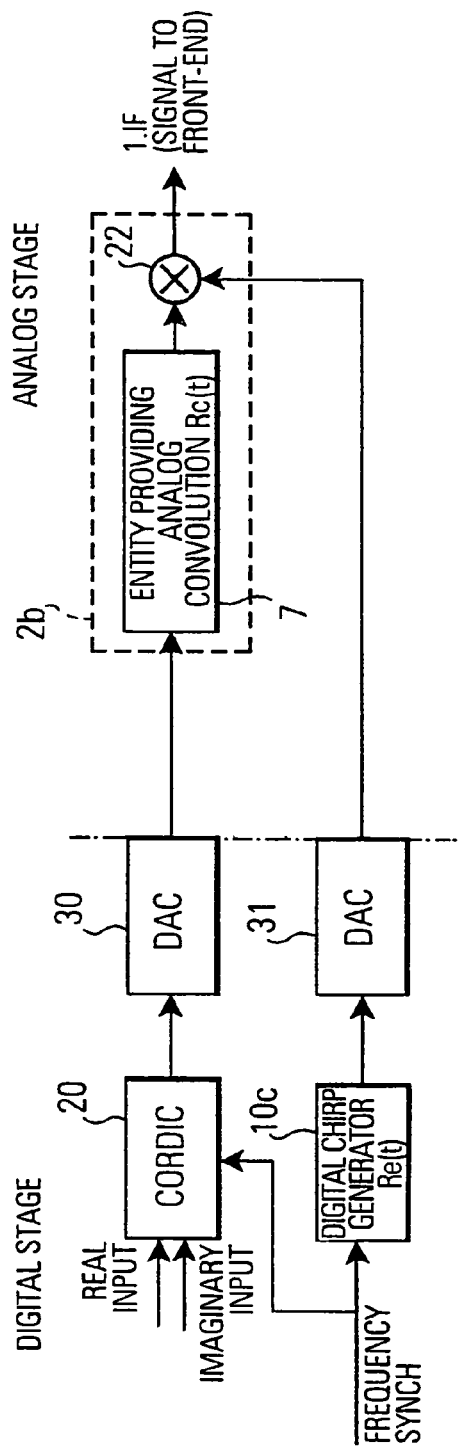

A transmitter according to the third further preferred embodiment of the invention simply works in reversed mode, i.e. as it is shown in FIG. 6b, wherein the digital processing unit 34 of the second further preferred embodiment of the present invention, as it is shown in FIG. 5b, is replaced with a CORDIC block 20 adapted to perform the first multiplication with the second chirp signal of the MCM algorithm.

FIG. 7a shows a block diagram of an OFDM receiver according to a fourth further preferred embodiment of the present invention. According to this fourth further preferred embodiment the analog second multiplication of the MCM algorithm and the analog low-pass filtering as shown in FIG. 4a for the OFDM receiver according to the first further preferred embodiment of the present invention is shifted into the digital stage, i.e. the output signal of the receiver transformation unit 2a is input to second and third multipliers 8 and 9 via an analog-to-digital converter 17. In this fourth further preferred embodiment the second and third multipliers 8 and 9 are realized as digital multipliers which output their respective output signal to digital low-pass filters 13 and 14. Furtheron, the second chirp signal is digitally generated by a digital third chirp generator 10c and input to a digital 90° phase splitter 11 which outputs the digital second chirp signal Re(t) to the second multiplier 8 and the 90° shifted digital second chirp signal Re(t) to the third multiplier 9. Furtheron, the digital second chirp signal Re(t) passes through a digital delay element 36 to be converted into a digital first chirp signal and a digital-to-analog converter 18 to the first analog multiplier 6 of the transformation unit 2a. The receiver transformation unit 2a is identical to and has the same functionality as the receiver transformation unit 2a shown and described in connection with the first further preferred embodiment of the present invention. The digital third chirp generator 10c generates digital chirp signals depending on time and frequency synchronisation signals.

Corresponding thereto FIG. 7b shows the block diagram of an OFDM transmitter according to the fourth further preferred embodiment of the present invention. This OFDM transmitter basically works in reversed mode to the OFDM receiver according to the fourth further preferred embodiment of the present invention shown in FIG. 7a.

Therefore, real and imaginary input signals are supplied to fourth and fifth multipliers 23 and 24, respectively via low-pass filters 32 and 33. The fourth and fifth multipliers 23 and 24 as well as the low-pass filters 32 and 33 are realized digitally. As in the first further preferred embodiment, the fourth and fifth multipliers 23 and 24 perform the first multiplication of the MCM algorithm i.e. a multiplication with a second chirp signal Re(t). In this case the second chirp signal Re(t) is generated by the digital third chirp generator 10c and is supplied inphase to the multiplier 23 and in quadrature to the multiplier 24 via a digital 90° phase splitter 11. The output signals of said both multipliers 23 and 24 are input to a digital adder 25 which supplies the resulting sum signal to the transmitter transformation device 2b via a digital-to-analog converter 30. The transmitter transformation device 2b is identical to and has the same functionality as the transmitter transformation device 2b shown and described in connection with the first further preferred embodiment of the present invention. In contrast to this first further preferred embodiment of the present invention the chirp signal needed for the second multiplication step of the MCM algorithm which is performed by the analog multiplier 22 is the same second digital chirp signal Re(t) generated by the digital third chirp generator 10c on basis of a control signal supplied thereto which passes through a digital delay element 36 and a digital to analog converter 31.

As can be seen from the description of the preferred embodiments according to the present invention, many modifications can be made without departing from the general concept of the present invention to provide an analog transformation unit within the analog stage of an OFDM telecommunication device which performs the main calculation needed for the Fourier Transformation or the Inverse Fourier Transformation.

The present invention is particularly applicable to BRAN systems, which is shown by the following simulation example.

The spectral resolution $\Delta f$ is determined by the duration of the expander chirp (Te) to $\Delta f=1/Te$. Assuming a length of $Te=3.2$ μsec the FT has a spectral resolution of 312 kHz. Furthermore, the analytic bandwidth $B=a(Bc-Be)$ ($|a|=Bc/Tc=Be/Te$). Assuming an expander bandwidth of 20 MHz the length of the analytic bandwidth is 20 MHz.

Figure 9:
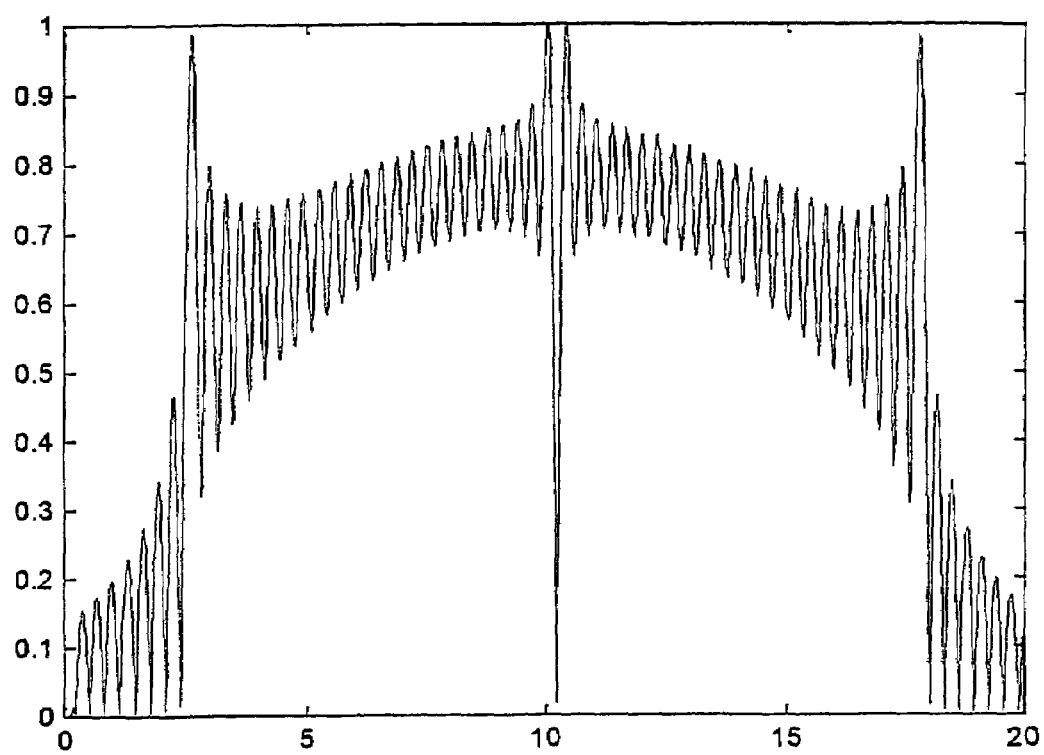
FIG. 9 shows the (simulated) spectrum of an OFDM signal demodulated according to the present invention.

The MCM FT algorithm has been applied on proposed device topology according to the method of operation. FIG. 9 shows the spectrum of an ODFM signal demodulated by one of the receiver assemblies according to the present invention.

The applied simulation set-up, i.e. analyzed signal bandwidth: 20 MHz, Te=3.2 μsec, Tc=6.4 μsec, Be=20 MHz, Bc=40 MHz, $\Delta f$=312 kHz, 64 point analog FT, 48 carriers used, is similar to the high data rate wireless LAN system called HIPERLAN/2, which is currently under standardization.

The invention claimed is:

1. An orthogonal frequency division multiplex (OFDM) telecommunication device comprising:
   a plurality of analog devices configured to sequentially perform an analog multiplication and an analog convolution after the analog multiplication on an analog signal,
   wherein said analog multiplication of said analog signal is configured to provide down-conversion of an RF analog signal at a radio frequency into an IF analog signal at an intermediate frequency,
   wherein said plurality of analog devices are configured to perform said multiplication and said convolution as operations of a Fourier transformation for an OFDM demodulation.

2. The OFDM telecommunication device of claim 1, wherein said telecommunication device is an orthogonal frequency division multiplex receiver.

3. The OFDM telecommunication device of claim 1, wherein said plurality of analog devices are configured to perform a further analog multiplication for said Fourier transformation on said analog signal.

4. An orthogonal frequency division multiplex (OFDM) telecommunication device comprising:
   a plurality of analog devices configured to sequentially perform an analog multiplication and an analog convolution after the analog multiplication on an analog signal,
   wherein said analog multiplication of said analog signal is configured to provide down-conversion of an RF analog signal at a radio frequency into an IF analog signal at an intermediate frequency,
   said telecommunication device is an orthogonal frequency division multiplex transceiver, and
   said plurality of analog devices are configured to perform, in either order, a further analog multiplication and a further analog convolution on a further analog signal as operations of an inverse Fourier transformation for an OFDM modulation.

5. An orthogonal frequency division multiplex (OFDM) telecommunication device comprising:
   a plurality of analog devices configured to sequentially perform an analog multiplication and an analog convolution after the analog multiplication on an analog signal,
   wherein said analog multiplication of said analog signal is configured to provide down-conversion of an RF analog signal at a radio frequency into an IF analog signal at an intermediate frequency,
   said telecommunication device is an orthogonal frequency division multiplex transceiver,
   said plurality of analog device are configured to perform, in either order, a second analog multiplication and a second analog convolution on a second analog signal, and
   said second analog multiplication of said second analog signal are configured to provide up-conversion of an IF analog signal at an intermediate frequency into an RF analog signal at a radio frequency.

6. An orthogonal frequency division multiplex (OFDM) telecommunication device comprising:
   a first analog device;
   a second analog device, and
   a third analog device,
   wherein said first analog device is configured to receive an RF analog signal at a radio frequency, configured to perform an analog multiplication as well as an RF/IF down-conversion thereon and configured to output a resultant IF analog signal at an intermediate frequency to said second analog device,
   said second analog device is configured to receive said IF analog signal and configured to perform an analog convolution thereon to provide an analog output signal, and
   said third analog device is configured to receive, as an output signal, said analog output signal from said second analog device and configured to perform an analog multiplication thereon,
   wherein said first, second, and third analog devices are configured to perform said multiplication and said convolution as operations of a Fourier transformation for an OFDM demodulation.

7. The OFDM telecommunication device of claim 6, wherein said telecommunication device is an orthogonal frequency division multiplex receiver.

8. The OFDM telecommunication device of claim 6, further comprising:
   an analog-to-digital converter configured to receive, as an analog input signal, said analog output signal from said second analog device and configured to convert said analog input signal into a corresponding digital output signal.

9. An orthogonal frequency division multiplex (OFDM) telecommunication device comprising:
   a first analog device;
   a second analog device; and
   a third analog device,
   wherein said first analog device is configured to receive an RF analog signal at a radio frequency, configured to perform an analog multiplication as well as an RF/IF down-conversion thereon and configured to output a resultant IF analog signal at an intermediate frequency to said second analog device,
   said second analog device is configured to receive said IF analog signal and configured to perform an analog convolution thereon to provide an analog output signal, further comprising, an analog-to-digital converter configured to receive, as an analog input signal, said analog output signal from said second analog device and configured to convert said analog input signal into a corresponding digital output signal, and a digital device configured to receive said digital output signal and configured to perform a digital multiplication thereon, wherein said first and second analog devices and said digital device are configured to perform said multiplication and said convolution as operations of a Fourier transformation for an OFDM demodulation.

10. The OFDM telecommunication device of claim 6, further comprising:

an antenna; and an amplification and pre-processing circuit configured to feed an OFDM signal received by said antenna to said first analog device as said RF analog signal.

11. An orthogonal frequency division multiplex (OFDM) telecommunication device comprising:

a first analog device;

a second analog device, and a third analog device, wherein said first analog device is configured to receive an RF analog signal at a radio frequency, configured to perform an analog multiplication as well as an RF/IF down-conversion thereon and outputting a resultant IF analog signal at an intermediate frequency to said second analog device, said second analog device is configured to receive said IF analog signal and configured to perform an analog convolution thereon to provide an analog output signal, said telecommunication device is an orthogonal frequency division multiplex transceiver, and said first and second analog devices are configured to perform said multiplication and said convolution as operations of an inverse Fourier transformation for an OFDM modulation.

12. The OFDM telecommunication device of claim 6, wherein said telecommunication device is an orthogonal frequency division multiplex transceiver, said second analog device is configured to receive an IF analog input signal at an intermediate frequency and configured to perform an analog convolution thereon to provide an analog IF output signal, and said first analog device is configured to receive said analog IF output signal, configured to perform an analog multiplication as well as an IF/RF upconversion thereon and configured to output a resultant RF analog signal at a radio frequency.

13. An orthogonal frequency division multiplex (OFDM) telecommunication device comprising:

a plurality of analog devices, wherein said plurality of analog devices are configured to perform, in either order, an analog multiplication and an analog convolution on an analog signal, and said plurality of analog devices are configured to perform said multiplication and said convolution as operations of an inverse Fourier transformation for an OFDM modulation.

14. The OFDM telecommunication device of claim 13, wherein said telecommunication device is an orthogonal frequency division multiplex transmitter.

15. The OFDM telecommunication device of claim 13, wherein said plurality of analog devices are configured to provide an up-conversion of an IF analog signal at an intermediate frequency to an RF analog signal at a radio frequency by said multiplication of said analog signal.

16. The OFDM telecommunication device of claim 13, wherein said plurality of analog devices are configured to perform a further analog multiplication for said inverse Fourier transformation on said analog signal.

17. The OFDM telecommunication device of claim 13, wherein said telecommunication device is an orthogonal frequency division multiplex transceiver, and said plurality of analog devices are configured to perform said multiplication and said convolution as operations of a Fourier transformation for an OFDM demodulation.

18. An orthogonal frequency division multiplex (OFDM) telecommunication device comprising:

a plurality of analog devices configured to sequentially perform, in either order, an analog multiplication and an analog convolution on an analog signal, wherein said multiplication of said analog signal is configured to provide up-conversion of an IF analog signal at an intermediate frequency to an RF analog signal at a radio frequency, said telecommunication device is an orthogonal frequency division multiplex transceiver, and said plurality of analog devices are configured to perform, in either order, a further analog multiplication and a further analog convolution on a further analog signal as operations of a Fourier transformation for an OFDM demodulation.

19. The OFDM telecommunication device of claim 18, wherein said telecommunication device is an orthogonal frequency division multiplex transmitter.

20. An orthogonal frequency division multiplex (OFDM) telecommunication device comprising:

a first analog device; and a second analog device, wherein said first analog device is configured to receive an analog signal and performing an analog convolution thereon to provide an intermediate analog signal, said second analog device is configured to receive said intermediate analog signal and configured to perform a multiplication thereon to provide an analog output signal, and said first and second analog devices are configured to perform said multiplication and said convolution as operations of an inverse Fourier transformation for an OFDM modulation.

21. The OFDM telecommunication device of claim 20, wherein said telecommunication device is an orthogonal frequency division multiplex transmitter.

22. The OFDM telecommunication device of claim 20, wherein said intermediate analog signal is an IF analog signal at an intermediate frequency and said multiplication of said intermediate analog signal is configured to provide up-conversion thereof to an RF analog signal at a radio frequency.

23. The OFDM telecommunication device of claim 20, further comprising:

a third analog device situation upstream on a signal path comprising said first and second analog devices said third analog device being configured to perform an analog multiplication on an analog signal, wherein said multiplications and said convolution of said first, second, and third analog devices are configured to provide said inverse Fourier transformation for an OFDM modulation.

24. The OFDM telecommunication device of claim 20, further comprising:
a digital-to-analog converter configured to convert a digital input signal into a corresponding analog output signal and configured to output said analog output signal to said first analog device as said analog signal.

25. The OFDM telecommunication device of claim 24, further comprising:
a digital device configured to perform a digital multiplication on a digital signal and configured to output a resultant digital signal to said digital-to-analog converter as said digital input signal,
wherein said multiplications and said convolution of first and second analog devices and said digital device are configured to provide said inverse Fourier transformations for an OFDM modulation.

26. The OFDM telecommunication device of claim 20, wherein said telecommunication device is an orthogonal frequency division multiplex transceiver, and
said first and second analog devices are configured to perform said multiplication and said convolution as operations of a Fourier transformation for an OFDM demodulation.

27. An orthogonal frequency division multiplex (OFDM) telecommunication device comprising:
a first analog device; and
a second analog device,
wherein said first analog device is configured to receive an IF analog signal at an intermediate frequency and configured to perform an analog convolution thereon to provide an intermediate IF analog signal,
said second analog device is configured to receive said intermediate IF analog signal, and configured to perform a multiplication as well as an IF/RF up-conversion thereon and outputting a resultant RF analog signal at a radio frequency,
said telecommunication device is an orthogonal frequency division multiplex transceiver, and
said first and second analog devices are configured to perform, in either order, a further analog multiplication and a further analog convolution on a further analog signal as operations of a Fourier transformation for an OFDM demodulation.

28. The OFDM telecommunication device of claim 27,
wherein said telecommunication device is an orthogonal frequency division multiplex transmitter.

29. The OFDM telecommunication device according to claim 1, wherein said OFDM telecommunication device further includes:
a processing unit configured to feed said IF analog signal to an A/D converter via at least one analog processing stage, without further down-conversion.

30. The OFDM telecommunication device according to claim 6, wherein said OFDM telecommunication device further includes:
a processing unit configured to feed said IF analog signal to an A/D converter via at least one analog processing stage, without further down-conversion.

31. The OFDM telecommunication device according to claim 9, wherein said OFDM telecommunication device further includes:
a processing unit configured to feed said IF analog signal to an A/D converter via at least one analog processing stage, without further down-conversion.

32. The OFDM telecommunication device according to claim 11, wherein said OFDM telecommunication device further includes:
a processing unit configured to feed said IF analog signal to an A/D converter via at least one analog processing stage, without further down-conversion.

* * * * *